Nov. 23, 1937.    R. G. THOMPSON    2,099,762
TYPEWRITING MACHINE
Filed Aug. 6, 1934    7 Sheets-Sheet 2
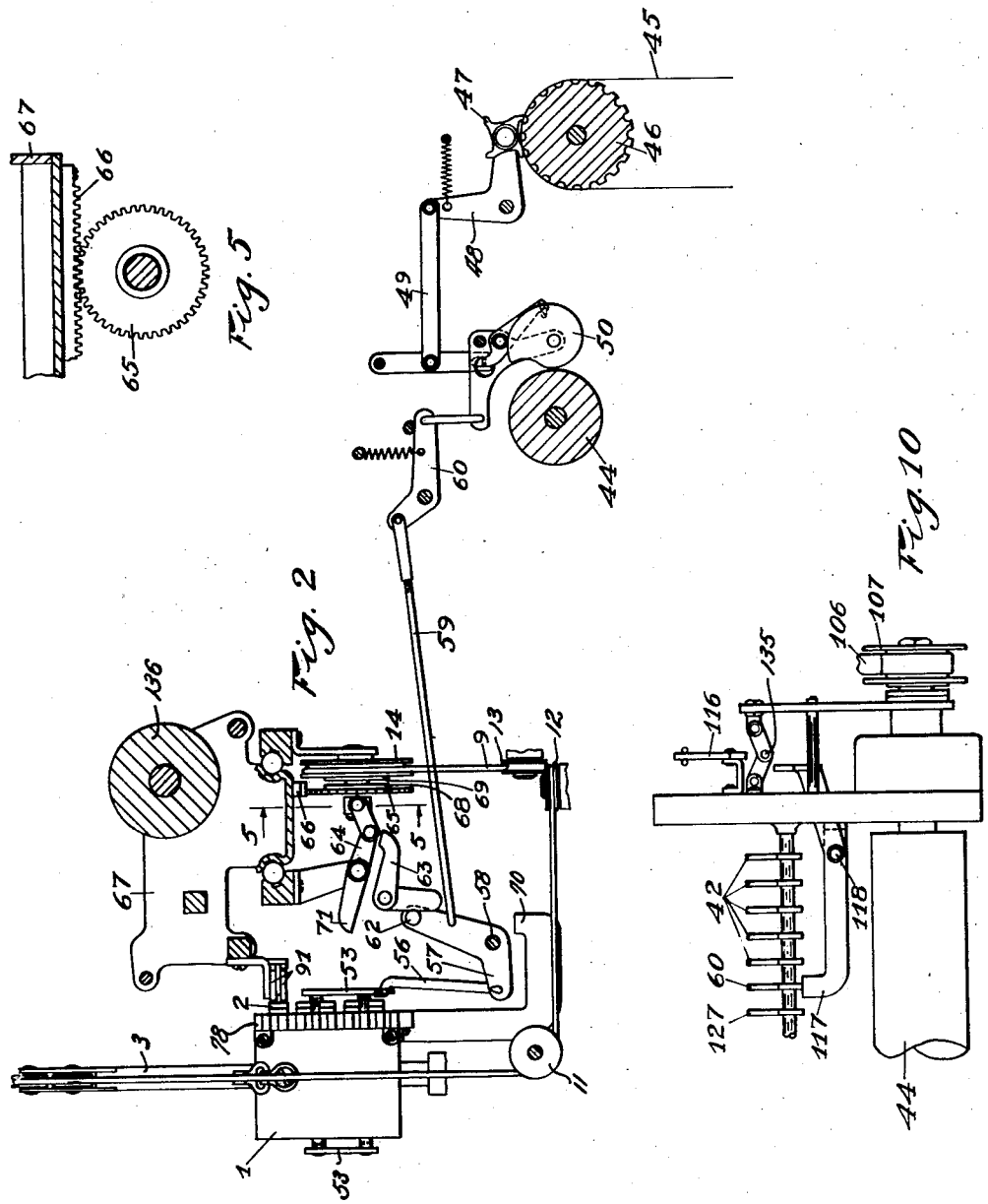
INVENTOR
Russell G. Thompson
BY Harold E. Stonebraker
ATTORNEY

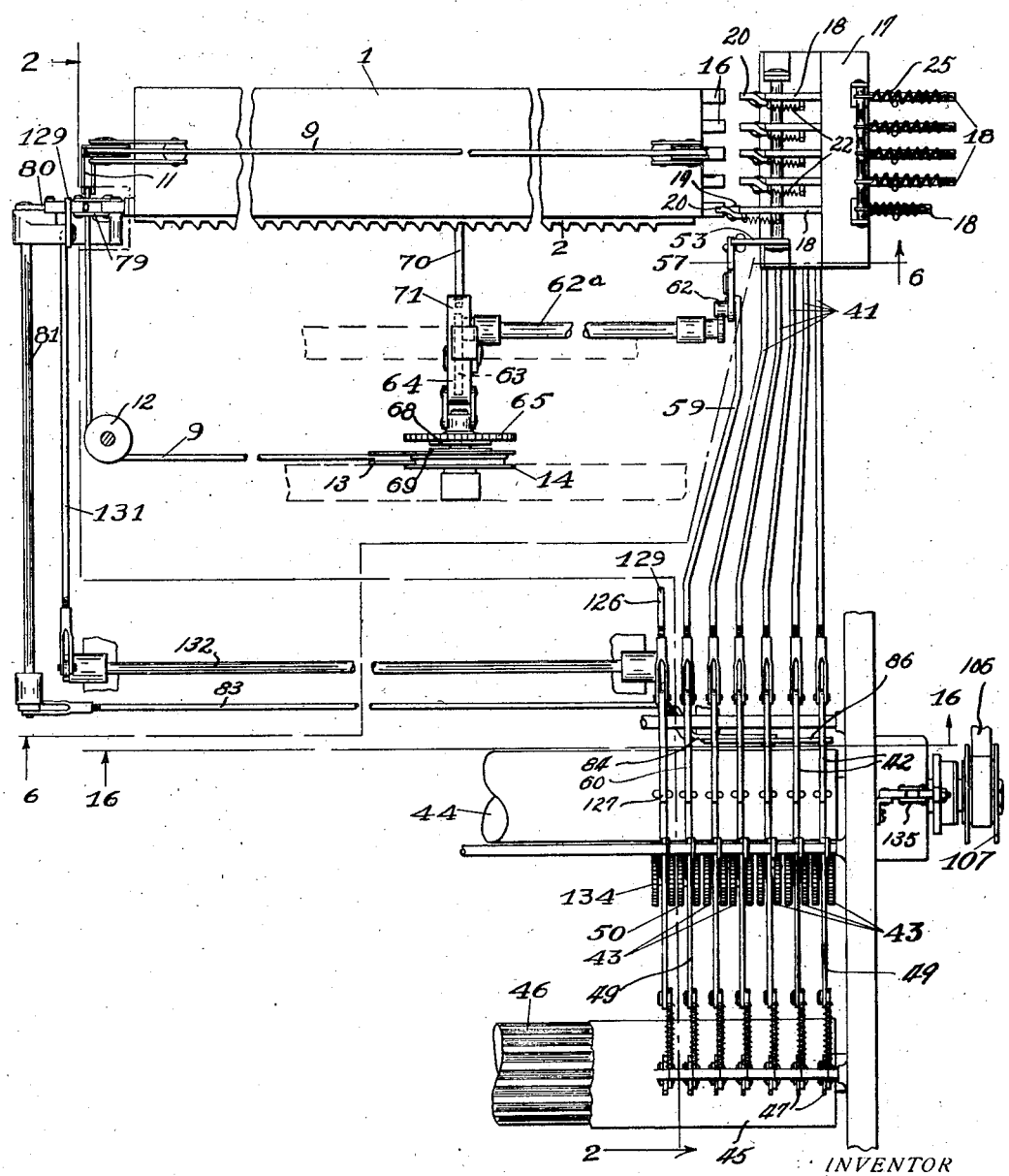

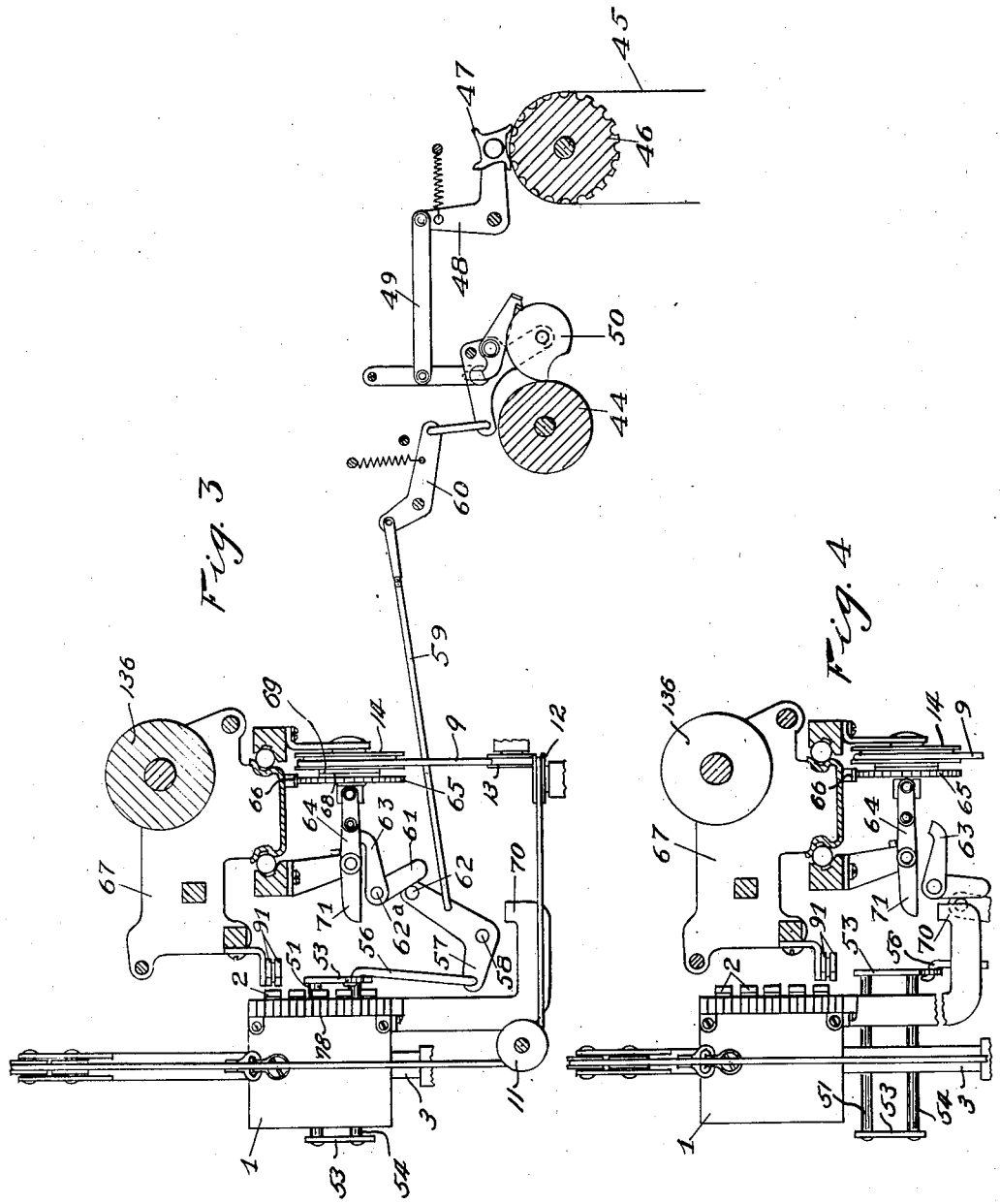

Nov. 23, 1937. R. G. THOMPSON 2,099,762
TYPEWRITING MACHINE
Filed Aug. 6, 1934 7 Sheets-Sheet 4

INVENTOR
Russell G. Thompson
BY Harold E. Stonebraker
ATTORNEY

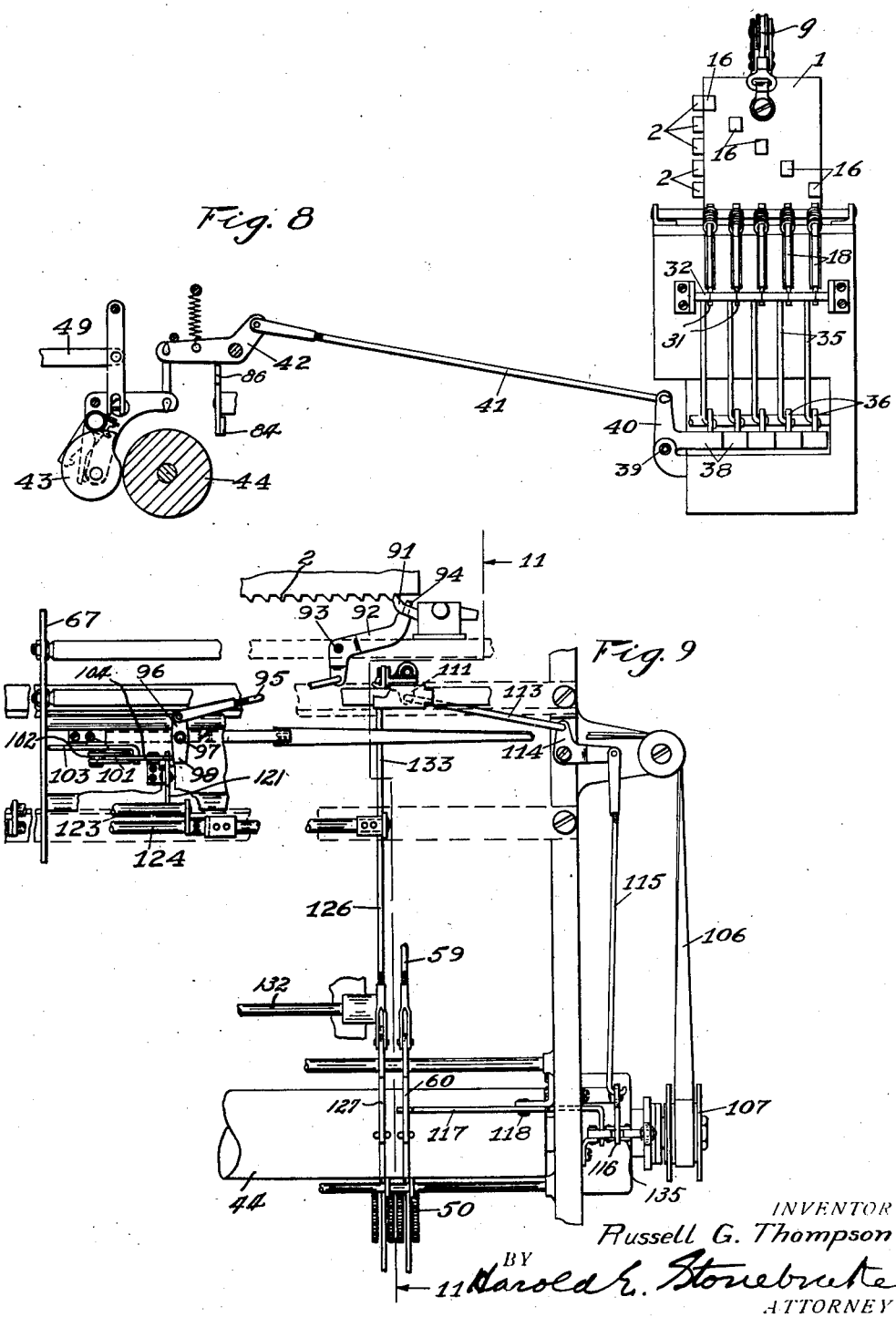

Nov. 23, 1937.  R. G. THOMPSON  2,099,762
TYPEWRITING MACHINE
Filed Aug. 6, 1934   7 Sheets-Sheet 6
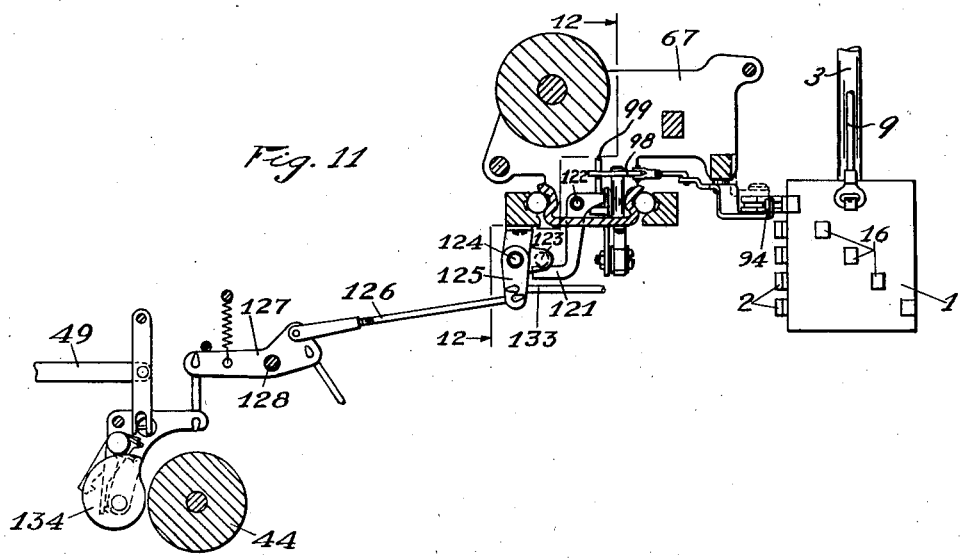
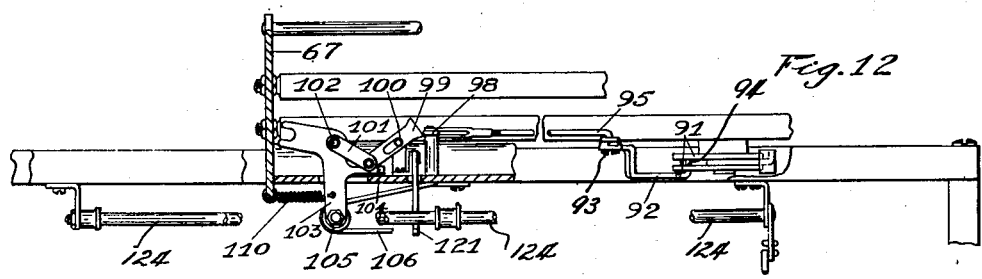
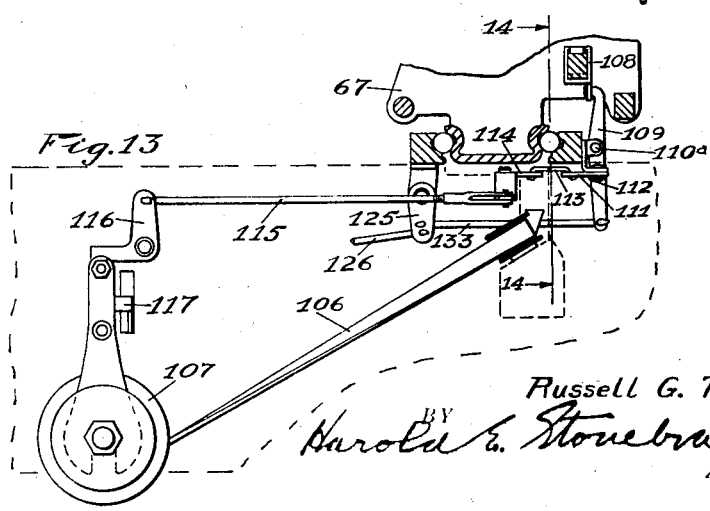

Nov. 23, 1937.  R. G. THOMPSON  2,099,762
TYPEWRITING MACHINE
Filed Aug. 6, 1934   7 Sheets-Sheet 7
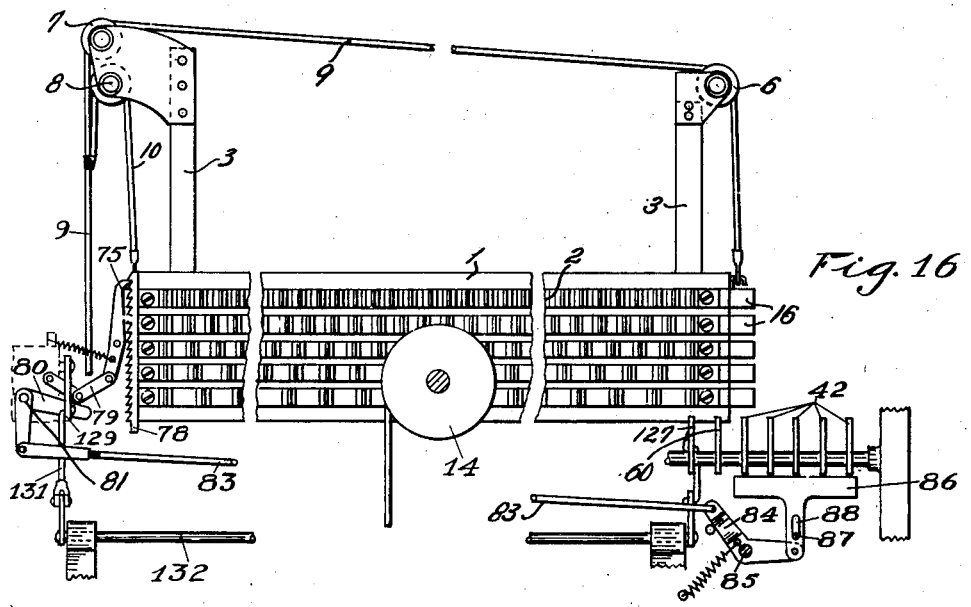
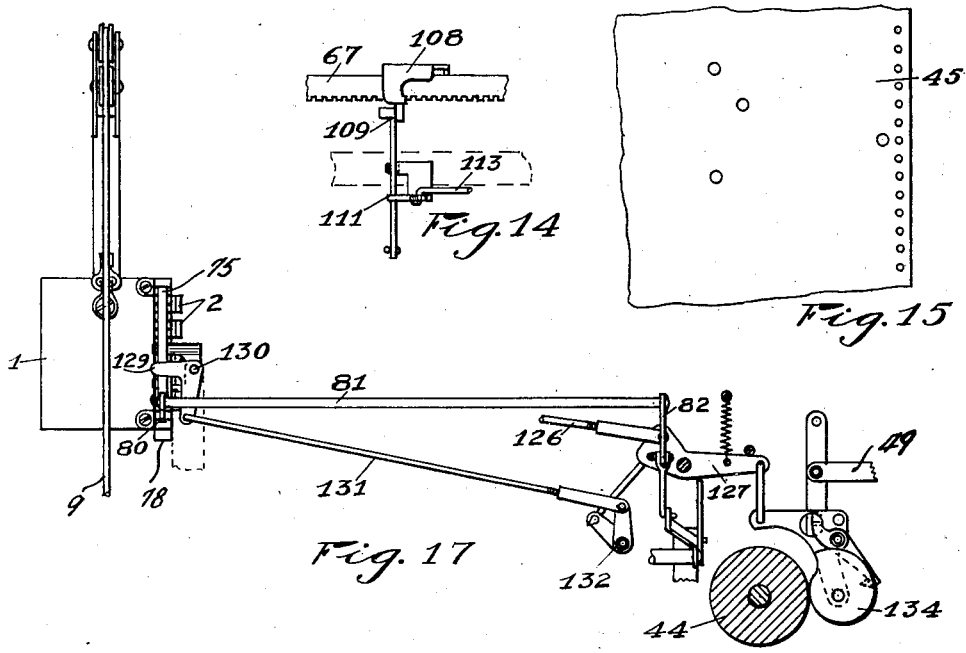
INVENTOR
Russell G. Thompson
BY Harold E. Stonebraker
ATTORNEY Patented Nov. 23, 1937

2,099,762

UNITED STATES PATENT OFFICE 2,099,762

TYPEWRITING MACHINE

Russell G. Thompson, Rochester, N. Y., assignor to Underwood Elliott Fisher Company, a corporation of Delaware Application August 6, 1934, Serial No. 738,573

49 Claims. (Cl. 197—20)

This invention relates to a typewriting machine, and has for its purpose to afford a practical and efficient structure for justifying the lines of typewritten matter and for readily varying the length of the lines of typewriting, or for varying the pitch or the spacing of the letter-feeding mechanism.

More particularly, the invention is intended to afford a construction that lends itself readily to an automatic machine in which the operations are controlled by a punched master sheet, an escapement rack being automatically selected and positioned in advance of the typing of each line, in accord with the number of characters in the line.

To these and other ends, the invention consists in the construction and arrangement of parts that will appear clearly from the following description when read in conjunction with the accompanying drawings, the novel features being pointed out in the claims following the specification.

In the drawings:

Fig. 1 is a partial plan view showing one practical embodiment of the invention;

Fig. 2 is a sectional view taken on line 2—2 of Fig. 1, showing the elevating mechanism for the escapement rack, the latter appearing in lowered position with one of its racks in operative relation to the carriage;

Fig. 3 is a view similar to Fig. 2 showing the position of the parts just previous to the return of the carriage and elevation of the escapement rack holder, the escapement pawls being retracted and a cam unit having been actuated to cause movement of the escapement rack holder upwardly when the carriage is returned;

Fig. 4 is a detail view similar to Fig. 3 and showing the position of the parts just before the escapement rack holder reaches its uppermost position;

Fig. 5 is a detail sectional view on line 5—5 of Fig. 2;

Fig. 8 is a side elevation looking from right to left of Fig. 1, and showing the escapement rack holder in its uppermost position;

Fig. 9 is a partial plan view showing the escapement rack, the escapement pawls on the carriage, and the controlling mechanism thereto and to the carriage return mechanism;

Fig. 10 is a detail elevation of a portion of the carriage return mechanism;

Fig. 11 is a transverse vertical sectional view on line 11—11 of Fig. 9 showing the normal position of the escapement pawls on the carriage and the devices which retract and return the escapement pawls;

Fig. 12 is a longitudinal vertical sectional view on line 12—12 of Fig. 11;

Fig. 13 is a side elevation looking from right to left of Fig. 9, and showing the carriage, and the mechanism for returning, locking and releasing the carriage;

Fig. 14 is a detail sectional view on line 14—14 of Fig. 13;

Fig. 15 is a detail plan view of the master punched control sheet;

Figure 6:
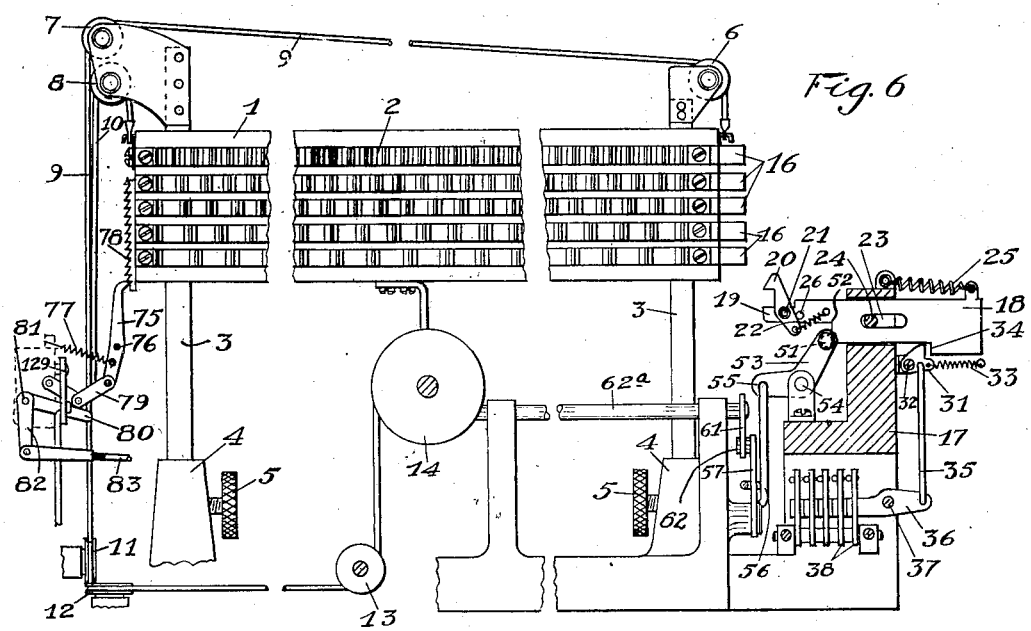
Fig. 6 is a longitudinal vertical sectional view on line 6—6 of Fig. 1, showing the position of the parts when the escapement rack holder is in uppermost position.

Fig. 16 is a longitudinal vertical sectional view on line 16—16 of Fig. 1, showing the locking means for holding the escapement rack holder in its uppermost position and the controlling devices for releasing said locking mechanism to permit lowering of the escapement rack holder, and Fig. 17 is a side elevation looking from left to right of Fig. 1, showing the locking and releasing means for the escapement rack holder.

The invention may be carried out in a variety of ways, and comprises in general the provision of a vertically adjustable escapement rack holder, supporting a plurality of letter-spacing racks, which can be entirely removed and replaced by another holder when a different length of line is required, escapement pawls mounted on the carriage of the machine for cooperation with the selected rack, punched sheet controlled mechanism for automatically withdrawing the escapement pawls from engagement with the rack when a line of writing is completed, releasing and elevating the escapement rack holder to its uppermost position during the return movement of the carriage, and releasing the escapement rack holder to permit it to move downwardly and arresting such downward movement when the rack to be selected is in position to cooperate with the escapement pawls on the carriage, and the following description will have to do first with the escapement rack holder and the mechanism whereby its downward movement is arrested and it is held in position when the selected rack is in operative relation to the escapement pawls on the carriage.

The escapement rack holder is designated at 1, see Figs. 1, 6, 7 and 8, and has mounted thereon a series or plurality of racks 2 one above the other, each of the same length but with a different number of teeth to afford a different number of characters to a given length of line. In the structure shown, there are five escapement racks providing for five different numbers of characters for one length of line, and if the length of line is to be varied, the escapement rack holder 1 is removed and another holder with racks of different length inserted. To accomplish this, the escapement rack holder is mounted for vertical movement on posts 3 which are removably secured in standards 4 on the frame and held in place by the clamping screws 5.

At the top of the posts 3 are pulleys 6, 7 and 8 respectively around which travel cables 9 and 10 which are hooked on to or otherwise removably attached at the upper ends of the escapement rack holder 1. The cable 10 is secured at its end to cable 9 so that they move as a unit, and cable 9 passes around guide pulleys 11, 12 and 13 and is fixedly connected to a winding pulley 14 by which the escapement rack holder is elevated during the return movement of the carriage in a manner that will be described presently.

At a predetermined time, the escapement rack holder is released from its uppermost position shown in Fig. 6, and starts to travel downwardly, its weight being sufficient to effect the necessary downward movement, although other means for accomplishing this may be provided. During such downward movement, one of the five racks is selected when it is in operative relation to the escapement pawls on the carriage and the downward movement of the escapement rack holder is arrested at such point and locked, holding the particular escapement rack in operative position. This is accomplished by the following mechanism.

Figure 7:
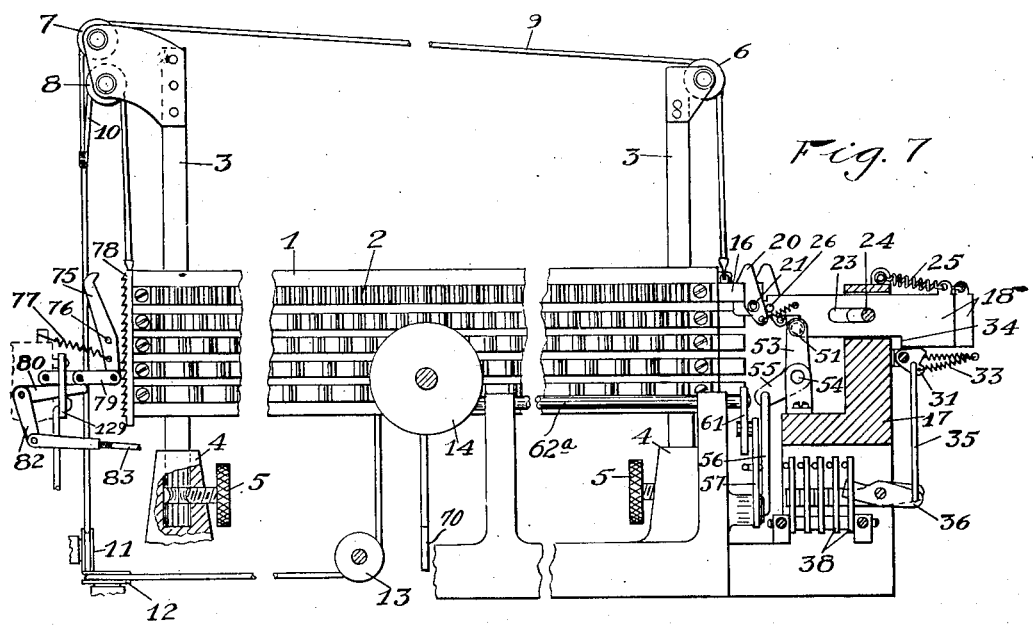
Fig. 7 is a view similar to Fig. 6 and showing the position of the parts after the escapement rack holder has been lowered and a rack selected for positioning in operative relation to the carriage.

At its right hand end, see Figs. 6, 7 and 8, the escapement rack holder 1 is provided with a series or plurality of stops or lugs 16 which are arranged in the same horizontal planes with the corresponding escapement racks and in different vertical planes, see Fig. 8, so as to cooperate with different selector units. The selector units are arranged in the different vertical planes of the stops 16 so as to engage any one stop and hold the escapement rack holder when the latter during its downward movement reaches such predetermined position.

One of the selector units is operated before the downward movement of the escapement rack holder commences, and the extent of downward movement of the latter is determined by the particular selector unit operated, such operation being automatically effected by a predetermined perforation in the master controlling sheet that will be described more fully hereinafter.

The several selector units are mounted for horizontal sliding movement in a stationary support 17 on the frame, see Figs. 6 and 7, and each selector unit includes a slide 18 having a stop portion 19 and a locking element or pawl 20 pivoted at 21 and actuated by a spring 22 against a stop pin 26. The slide 18 is slotted at 23, said slot engaging a pin 24 which limits the back and forth travel of the slide, and the latter is actuated toward operating position by a spring 25.

All of the selector units are held in the retracted or inoperative position shown in Fig. 6 by locking devices, one of which is automatically released in advance of the downward movement of the escapement rack holder, according to a predetermined schedule, and thereupon the spring 25 actuates the released selector unit to the position shown in Fig. 7, whereupon the escapement rack holder moves downwardly until the stop portion 19 of the selector unit engages one of the stops 16, as shown in Fig. 7, thus preventing further downward movement of the escapement rack holder while upward movement is prevented by the locking member 20. The escapement rack thus locked is in operative position for controlling the forward movement of the typewriter carriage and remains in this position until the line of typewriting is completed, whereupon the selector unit is automatically retracted from locking relation with the escapement rack and the rack holder is free to return to its uppermost position during the return movement of the carriage. The mechanism for locking the selector units in retracted position and returning them to such position after completion of a line of typewriting will now be described.

Each selector unit is controlled by a locking dog 31 pivoted at 32 and actuated by a spring 33 which holds the dog normally in locking relation with a shoulder 34 on the slide 18, as shown in Fig. 6. 35 is a link connecting the dog 31 with a lever 36, the latter being pivoted at 37 and arranged to be engaged and operated by one arm 38 of a bell crank lever pivoted at 39, see Fig. 8. The levers 36 are of different lengths, and the arms 38 of the bell crank levers are of different lengths, each of said bell cranks serving to operate one of said levers 36 to rock it in the manner shown in Fig. 7 and release the locking dog 31 to permit the corresponding selector unit to move to operative position.

Each of said bell crank levers pivoted at 39 has a vertical arm 40 connected by a rod 41 with a bell crank lever 42 which in turn is connected to and operated by a cam unit 43 that is operated by the continuously rotating power roller 44. The unit 43 and power roller 44 may be of conventional construction, in accordance with the structures heretofore used in electrically operated typewriting machines, as shown in Patents Nos. 1,688,364, October 23, 1928, and 1,777,056, September 30, 1930, and the cam units are arranged for operation by a punched controlling sheet 45, see Figs. 2, 3 and 15, which travels around the grooved roll 46, the predetermined perforations in the sheet 45 actuating a star wheel 47 and through it a bell crank 48 and link 49 connected to the cam unit 43, see Fig. 8.

This particular punched sheet controlling mechanism is also of conventional type such as shown in the aforesaid Patent No. 1,688,364, the predetermined perforation in the sheet 45 in the present instance serving to operate one of the five cam units 43, and through it one of the locking dogs 31 and thus release the corresponding selector unit for determining the escapement rack to be positioned in operative relation to the escapement pawls on the carriage.

By the mechanism thus far described, one selector unit is automatically positioned as shown in Fig. 7, and after the completion of a line of typewriting, it is necessary to restore said selector unit to the position shown in Fig. 6 to permit vertical return of the escapement rack holder. This is accomplished by a retractor bar 51, see Figs. 4, 6 and 7, which engages shoulders 52 on the slides 18, the retractor bar being mounted between the arms 53 which are fixed to the rock shaft 54. One of said arms 53 has an extension 55, see Figs. 4, 6 and 7, which is connected by a link 56 with a bell crank 57, see Fig. 3, pivoted at 58 and connected by a rod 59 with a bell crank 60, which in turn is operated by a cam unit 50, see Figs. 2 and 3, from the punched controlling sheet already described, so that after completion of a line of typewriting, a predetermined hole in the master sheet operates the cam unit 50 to actuate rod 59 and thereby, through bell crank 57 and link 56, the retractor bar 51, thus moving the previously operated selector unit back to the position shown in Fig. 6 and insuring the locking of all the selector units in retracted position, the escapement rack holder being then free to move to its uppermost position.

Immediately following this, the carriage is automatically returned by a well known type of mechanism and the escapement rack holder is elevated at the same time. The mechanism for elevating the escapement rack holder will now be described. Referring to Figs. 3 and 6, when the bell crank 57 is operated, it actuates an arm 61, the latter being engaged by a pin 62 on the bell crank lever 57. Arm 61 is mounted on a rock shaft 62ª which carries at its opposite end an arm 63 that engages a toggle lever 64, the latter being connected to a gear 65, see Figs. 1, 2 and 3. The gear 65 engages a rack 66 mounted on the underside of the typewriter carriage 67, see Figs. 3 and 5, so that as the carriage 67 carrying a platen 136 is returned automatically, as well known in the art, it rotates the gear 65. Gear 65 also carries a clutch face 68 which is adapted to cooperate with a clutch face 69 on the aforementioned pulley 14, see Figs. 1, 2 and 6. The gear 65 is movable laterally when the toggle lever 64 is operated from the position shown in Fig. 2 to that shown in Figs. 3 and 4, and when in the latter position, the clutch elements 68 and 69 being engaged, the movement of the carriage and of the gear 65 is transmitted to pulley 14 which winds the cable 9 during the return movement of the carriage and thus elevates the escapement rack holder from the position shown in Fig. 7, or whatever its operative position may have been, to its uppermost position shown in Fig. 6. When the escapement rack holder reaches the upper limit of its movement, an arm 70 carried thereby, see Figs. 3 and 4, engages a tail piece 71 of toggle lever 64 and breaks the toggle joint, moving said toggle lever to the position shown in Fig. 2 and thus stopping further upward movement of the escapement rack holder.

The escapement rack holder is held in such uppermost position by a locking dog 75, see Fig. 6, which is pivoted at 76 and actuated by a spring 77 for engagement with a locking rack 78 mounted on the adjacent end of the escapement rack holder. Before elevation of the rack holder 1 to normal position, the locking dog 75 is in position, as in Figure 16, ready to hold the escapement rack holder in the Figure 6 position, and said dog is automatically released, when a selector unit is operated, to permit downward movement of the escapement rack holder, by the following mechanism. The dog 75 is connected to a toggle lever 79, and 80 is an arm engageable with said toggle lever and secured to a rock shaft 81 which has fixed thereon an arm 82 connected by a rod 83 with a bell crank 84, see Fig. 16, the latter being pivoted at 85, and operatively connected to a vertically slidable plate 86 operatively positioned under the bell cranks 42 and guided vertically by a pin 87 engaging a slot 88. The bell cranks 42, as previously described, are connected to and control the release of the selector units, and when any one of the selector units is released by the punched controlling sheet, the operation of the bell crank 42 depresses the slidable plate 86 and through the rod 83 operates the toggle lever 79, and thereby moves the locking dog 75 from the position shown in Fig. 16 to the position shown in Fig. 7. The escapement rack holder is then free to travel downwardly under its own weight until stopped by the selector unit that has previously been released.

Following the completion of a line of typewriting and before the carriage starts to return, it is necessary to withdraw the escapement pawls from their operative position in engagement with the escapement rack, also to return the escapement pawls to operative position after the carriage has been returned and the escapement rack holder moved to its operative position and at the same time to move the escapement rack locking member again into operative engagement therewith, and the mechanism by which these operations are effected will now be described.

Referring to Figs. 9 and 12, 91 designate each of a pair of escapement pawls mounted on the carriage 67 and arranged to be operated by a universal bar in a conventional and well known manner. The escapement pawls 91 are moved out of operative position by a bell crank lever 92 which is pivoted at 93 on the carriage and has an end portion 94 which extends in front of the escapement pawls 91 and retracts them from operative position when the bell crank 92 is operated. The latter is connected by a rod 95 with a lever 96 that is pivoted at 97 and has its opposite end 98 located in the path of a toggle lever 99 that is guided on a pin 100 and pivotally connected to the toggle arm 101, the latter being pivoted at 102 to an arm 103 which also swings on the pivot 102 and has an extension 104 which engages the pivotal connection between arm 101 and toggle lever 99 when the arm 103 is swung. 110 is a spring for returning arm 103 to normal position.

Said arm 103 carries a pulley 105 around which passes the tape 106 which has one end connected to the carriage and its opposite end connected to the carriage return winding drum 107. The operation of the carriage return winding drum and tape is the same as in the conventional automatic typewriting machine, and with the present construction, the initial pull on the tape 106 causes the arm 103 to swing, thus straightening the toggle joint formed by lever 99 and arm 101 and swinging the bell crank lever 92 to retract the escapement pawls from operative relation with the escapement rack.

When the escapement pawls are thus retracted by the swinging of arm 103, further pull on tape 106 causes the return movement of the carriage, which continues until the adjustable stop 108 on the carriage moves past the lever 109, see Figs. 13 and 14, rocking the latter on its pivot 110ª, and lever 109 during such movement engages and operates the rocking plate 111, which is pivoted at 112 and connected through link 113, rock arm 114, and connecting rod 115 to bell crank 116 which actuates a clutch shifting device 135, Figure 9, so as to disengage the tape winding drum 107 from the power roller and stop the return movement of the carriage.

The tape winding drum 107 is operated to return the carriage by the previously described cam unit 50, the bell crank 60 of said cam unit operating a lever 117, see Fig. 9, which is pivoted at 118 and actuates the clutch shifter 135 to engage winding drum 107 with the power driven roll, as usual in this class of mechanism.

Thus when the cam unit just referred to is operated by a predetermined punched hole in the control sheet, the escapement pawls are automatically retracted by the mechanism just described, the escapement rack holder is automatically elevated, and the carriage is automatically returned until it reaches a predetermined point depending upon the position of the adjustable stop 108 and lever 109, whereupon the return movement of the carriage is automatically stopped. Following the selection of a rack and the accompanying retraction of the escapement rack holder lock 75, it is necessary to return the escapement pawls to operative position and unlock the carriage, also to return said escapement rack holder lock 75 to its locking position to prepare the parts for another line writing operation, and the mechanism by which this is accomplished will now be described.

Referring to Figs. 11 and 12, 121 designates a bell crank lever pivoted at 122 with its upper part in position when rocked to engage lever 99 and break the toggle joint holding the escapement pawls retracted, permitting the latter to return by spring action to their normal position. The lower part of said lever 121 is engaged by an arm 123 on a rock shaft 124 carrying an arm 125 that is connected by rod 126 to a lever 127 pivoted at 128 and controlled by a cam unit 134, see Figs. 1 and 11, that is governed by a predetermined opening in the punched control sheet so that when said cam unit is operated, the escapement pawls are permitted to return to operative position through the mechanism just described. At the same time, the locking member 75, see Fig. 7, is returned into locking engagement with the locking rack 78 on the escapement rack holder. This is accomplished by the arm of a bell crank lever 129 pivoted at 130, see Fig. 17, and connected by rod 131 and rock shaft 132 to the aforementioned bell crank lever 127.

At the same time that this operation takes place, the carriage is also released from the locking lever 109, see Fig. 13. To accomplish this, the rock arm 125 is connected by rod 133 to the lower end of the lever 109, so that when the mechanism just described is actuated, the lower end of said lever 109 is moved to the left with reference to Fig. 13 and its upper end swung in the opposite direction, permitting the stop 108 to ride past the lever 109 and thus release the carriage for line writing movement, the escapement pawls having previously been brought into operative control with the selected escapement rack. When a line of typewriting is completed, the escapement pawls are again retracted from the selected escapement rack, the escapement rack holder is released and elevated, the carriage at the same time being returned to initial position and the parts are ready for a repetition of the operation already described.

While the invention has been described with reference to the details of construction disclosed, it is not restricted to the particular construction or method of operation set forth, and this application is intended to cover such other modifications or departures as may come within the purposes of the improvements or the scope of the following claims.

I claim:

1. In a typewriting machine, the combination with a frame and a carriage movable thereon, of an escapement pawl mounted on the carriage, an escapement rack holder adjustable on the frame, a series of escapement racks mounted on said holder, rack-selecting means, and means operable by power under control of said rack-selecting means for adjusting said holder to select one of the racks and position it in operative relation to the carriage.

2. In a typewriting machine, the combination with a frame and a carriage movable thereon, of an escapement pawl mounted on the carriage, an escapement rack holder adjustable on the frame, a series of escapement racks mounted on said holder, and sheet controlled automatic means for adjusting said holder to selectively position one of said racks in operative relation to the carriage.

3. In a typewriting machine, the combination with a frame and a carriage movable thereon, of an escapement pawl mounted on the carriage, an escapement rack holder vertically adjustable on the frame, a series of escapement-racks mounted on said holder, and sheet controlled automatic means for adjusting said holder to selectively position one of said racks in operative relation to the carriage.

4. In a typewriting machine, the combination with a frame and a carriage movable thereon, of an escapement pawl mounted on the carriage, an escapement rack holder adjustable and removably positioned on the frame, a series of escapement racks mounted on said holder, and sheet controlled automatic means for adjusting said holder to selectively position one of said racks in operative relation to the carriage.

5. In a typewriting machine, the combination with a frame and a carriage movable thereon, of an escapement pawl mounted on the carriage, an escapement rack holder vertically adjustable and removably positioned on the frame, a series of escapement-racks mounted on said holder, and sheet controlled automatic means for adjusting said holder to selectively position one of said racks in operative relation to the carriage.

6. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units mounted on the frame, each of said selector units cooperating with one of said escapement racks and operable to stop and lock said escapement rack in operative relation to the escapement pawl, and sheet controlled automatic means for operating said selector units.

7. In a typewriting machine, the combination with a frame and a carriage movable thereon, of an escapement pawl mounted on the carriage, an escapement rack holder vertically adjustable on the frame, a series of escapement racks arranged on the holder one above the other, and a series of selector units mounted on the frame, each of said selector units being movable into the path of one of said escapement racks and operating to stop and lock said rack in operative relation to said escapement pawl.

8. In a typewriting machine, the combination with a frame and a carriage movable thereon, of an escapement pawl mounted on the carriage, an escapement rack holder vertically adjustable on the frame, a series of escapement racks mounted on the holder one above the other, a series of stops on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl on the carriage, and sheet controlled automatic means for operating one of said selector units.

9. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units mounted on the frame, each of said selector units cooperating with one of said racks and including a stop portion and a locking element for stopping and retaining a selected rack in operative relation to said escapement pawl, and means for operating said selector units.

10. In a typewriting machine, the combination with a frame and a carriage movable thereon, of an escapement pawl mounted on the carriage, an escapement rack holder vertically adjustable on the frame, a series of escapement racks mounted on the holder one above the other, a series of stops on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl on the carriage, and means for operating said selector units.

11. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units movably mounted on the frame, each of said selector units cooperating with one of said escapement racks and operable to stop and lock said rack in operative relation to said escapement pawl, locking devices for holding the selector units out of operative position, spring means for moving the selector units into operative position, and sheet-controlled automatic means for operating one of said locking devices to release the corresponding selector unit.

12. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units movably mounted on the frame, each of said selector units cooperating with one of said escapement racks and operable to stop and lock said rack in operative relation to said escapement pawl, locking devices for holding the selector units out of operative position, spring means for moving the selector units into operative position, and means for operating said locking devices to release the selector units.

13. In a typewriting machine, the combination with a frame and a carriage movable thereon, of an escapement pawl mounted on the carriage, an escapement rack holder vertically adjustable on the frame, a series of escapement racks mounted on said holder one above the other, a series of stop members on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl, locking devices for holding said selector units out of operative position, spring means for actuating the selector units into operative position, and sheet controlled automatic means for actuating one of said locking devices to release the corresponding selector unit.

14. In a typewriting machine, the combination with a frame and a carriage movable thereon, of an escapement pawl mounted on the carriage, an escapement rack holder vertically adjustable on the frame, a series of escapement racks mounted on said holder one above the other, a series of stop members on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl, locking devices for holding said selector units out of operative position, spring means for actuating the selector units into operative position, and means for operating said locking devices to release the selector units.

15. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units movably mounted on the frame, each of said selector units cooperating with one of said escapement racks and acting to stop and lock said escapement rack in operative relation to said escapement pawl, sheet controlled automatic means for operating one of said selector units to move it into operative relation with the rack to be selected, and means acting automatically to restore said selector unit to inoperative position upon completion of a line of typewriting.

16. In a typewriting machine, the combination with a frame and a carriage movable thereon, of an escapement pawl mounted on the carriage, an escapement rack holder vertically adjustable on the frame, a series of escapement racks mounted on said holder one above the other, a series of stop members on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl, sheet controlled automatic means for operating one of said selector units, and means acting automatically to restore said selector unit to inoperative position upon completion of a line of typewriting.

17. In a typewriting machine, the combination with a frame and a carriage movable thereon, of an escapement pawl mounted on the carriage, an escapement rack holder vertically adjustable on the frame, a series of escapement racks arranged on the holder one above the other, a series of selector units mounted on the frame, each of said selector units cooperating with one of said escapement racks and operable to stop and lock said rack in operative relation to said escapement pawl, locking devices for holding the selector units out of operative position, spring means for moving the selector units into operative position, sheet controlled automatic means for operating one of said locking devices to release the corresponding selector unit, and means acting automatically to restore said selector unit to inoperative position upon completion of a line of typewriting.

18. In a typewriting machine, the combination with a frame and a carriage movable thereon, of an escapement pawl mounted on the carriage, an escapement rack holder vertically adjustable on the frame, a series of escapement racks mounted on said holder one above the other, a series of stop members on the rack holder arranged in different vertical planes and in the same horizontal planes as the corresponding racks, a series of selector units movably mounted on the frame, each of said selector units cooperating with one of said stops and including a stop portion and a locking element for stopping and retaining the corresponding rack in operative relation to said escapement pawl, locking devices for holding said selector units out of operative position, spring means for actuating the selector units into operative position, sheet controlled automatic means for actuating one of said locking devices to release the corresponding selector unit, and means acting automatically to restore said selector unit to inoperative position upon completion of a line of typewriting.

19. In a typewriting machine, the combination with a frame and a carriage movable thereon, of an escapement pawl mounted on the carriage, an escapement rack holder vertically adjustable on the carriage, a series of escapement racks mounted on said holder, a locking device for retaining the holder in uppermost position, means for automatically releasing said locking device and permitting the holder to move downwardly, automatic means for stopping the downward movement of the holder at a predetermined point to select one of said racks, and means acting automatically after the completion of a line of typewriting to release the escapement rack holder and actuate it to its uppermost position.

20. In a typewriting machine, the combination with a frame and a carriage movable thereon, of an escapement pawl mounted on the carriage, an escapement rack holder vertically adjustable on the carriage, a series of escapement racks mounted on said holder, means acting automatically to stop the downward movement of the holder at a predetermined point to select one of said racks, and means acting automatically after the completion of a line of typewriting to actuate said rack holder to its uppermost position.

21. In a typewriting machine, the combination with a frame and a carriage movable thereon, of an escapement pawl mounted on the carriage, an escapement rack holder vertically adjustable on the carriage, a series of escapement racks mounted on said holder, a locking device for retaining the holder in uppermost position, means for automatically releasing said locking device and permitting the holder to move downwardly, automatic means for stopping the downward movement of the holder at a predetermined point to select one of said racks, means acting automatically after the completion of a line of typewriting to release the escapement rack holder and actuate it to its uppermost position, and means acting automatically to withdraw said escapement pawl away from operative engagement with the escapement rack upon completion of a line of typewriting and to restore said escapement pawl to operative position after the selected rack is positioned for the next line of typewriting.

22. In a typewriting machine, the combination with a frame and a carriage movable thereon, of an escapement pawl mounted on the carriage, an escapement rack holder vertically adjustable on the carriage, a series of escapement racks mounted on said holder, automatic means for stopping the downward movement of the holder at a predetermined point to select one of said racks, means acting automatically after the completion of a line of typewriting to release the rack holder and actuate it to its uppermost position, and means acting automatically to withdraw said escapement pawl from engagement with the rack upon completion of a line of typewriting and to restore said pawl to operative position after the selected rack is positioned for the next line of typewriting.

23. In a typewriting machine, the combination with a frame and a carriage movable thereon, of an escapement pawl mounted on the carriage, an escapement rack holder adjustable on the frame, a series of escapement-racks mounted on said holder, and means operable to move said escapement pawl out of engagement with a rack upon completion of a line of typewriting and to restore said pawl to operative position after a selected rack is positioned for the next line of typewriting.

24. In a typewriting machine, the combination with a frame and a carriage movable thereon, of an escapement pawl mounted on the carriage, an escapement rack holder adjustable on the frame, a series of escapement-racks on said holder, and means acting automatically to retract said escapement pawl from its operative position before adjustment of the rack holder and to restore said pawl to operative position after a selected rack is positioned.

25. In a typewriting machine, the combination with a frame and a carriage movable thereon, of an escapement pawl mounted on the carriage, an escapement rack holder adjustable on the frame, a series of racks mounted on said holder, sheet controlled automatic means for adjusting said holder to selectively position one of said racks in operative relation to said escapement pawl, and means acting automatically to move said escapement pawl out of operative engagement with the rack before the rack holder is adjusted and to restore said pawl to operative relation after the selected rack is positioned.

26. In a typewriting machine, the combination with a frame and a carriage movable thereon, of an escapement pawl mounted on the carriage, an escapement rack holder vertically adjustable on the frame, carriage return mechanism, and means actuated by the carriage return mechanism for moving the rack holder to its uppermost position.

27. In a typewriting machine, the combination with a carriage, of variable-pitch letter-feeding mechanism therefor including a plurality of devices selectively usable for differentially predetermining a letter-space pitch of a line of typing, and means acting automatically, according to a predetermined schedule, to effect selection of one of said pitch-determining devices preparatory to the typing of each line.

28. In a typewriting machine, the combination with a carriage, of variable-pitch letter-feeding mechanism therefor, said letter-feeding mechanism being adjustable for differentially predetermining a letter-space pitch of a line of typing, and means acting automatically, according to a predetermined schedule, to so adjust said letter-feeding mechanism preparatory to the typing of each line.

29. In a typewriting machine, the combination with a carriage, of variable-pitch letter-feeding mechanism therefor, said letter-feeding mechanism including pitch-regulating means displaceable from a primary position to another position for predetermining a letter-space pitch of a line of typing, and means whereby the return of the carriage, following the typing of the line, effecs restoration of said pitch-regulating means to said primary position.

30. In a typewriting machine, the combination with a carriage, of variable-pitch escapement-mechanism therefor including an escapement-pawl-device, a plurality of pitch-determining members, one or another of which may be brought into cooperative relation with said pawl-device for predetermining a letter-space pitch of a line of typing, and means acting automatically, according to a predetermined schedule, for bringing one of said pitch-determining members into said co-operative relation preparatory to the typing of each line of a page.

31. In a typewriting machine, the combination with a carriage, of variable-pitch escapement-mechanism therefor including an escapement-pawl-device, a plurality of escapement-racks of different pitches, and means acting automatically, according to a predetermined schedule, to bring one or another of said racks and said pawl-device into co-operative relation preparatory to the typing of each line of a page, whereby the letter-spacing pitch of the lines of a page is varied to justify the typed lines.

32. In a variable-pitch carriage-escapement mechanism for a typewriting machine, the combination of an escapement-pawl, a series of escapement-racks of different pitches, and means whereby said pawl and series of racks may be relatively moved, so that the pawl may coact with any one of said racks, said last-named means including a power device, a trip whereby said power device is enabled to effect such relative movement of the series of racks and pawl, and stop means for differentially limiting such movement to bring one or another rack into use.

33. In a sheet-controlled typing machine, the combination with a letter-feed carriage, of an escapement-pawl, a series of letter-feed racks of different pitches, and sheet-controlled means whereby preparatory to the typing of a line one or another of said racks and said pawl are automatically brought into co-operative relation to predetermine a letter-space pitch of the line.

34. In a typewriting machine, the combination of a carriage, an escapement-dog, a plurality of escapement-members for different letter-feed pitches, a holder for said escapement-members, said holder being adjustable relatively to said dog whereby said dog may co-operate with any one of said escapement-members for the purpose of letter-feeding the carriage at different line-justifying pitches, a plurality of selectively operable control devices, each representing one of said escapement-members, and means whereby the operation of any one of said control devices, preparatory to the typing of a line, controls said adjustable escapement-member holder, so that the escapement-member designated by said operation will be in operative relation to said escapement-dog at said typing of the line.

35. In a typewriting machine, the combination of a carriage, a variable-spacing letter-feeding mechanism for said carriage, said letter-feeding mechanism being adjustable for different letter-feed spacings for justifying the typed lines, a plurality of selectively operable control devices, each representing a certain letter-feed spacing of a line of typing, and means acting automatically in response to operation of any one of said control devices preparatory to typing a line to adjust said letter-feeding mechanism for the letter-feed spacing designated by the operated control device.

36. In a typewriting machine, the combination of a carriage, a carriage-return mechanism operable by power, a variable-pitch letter-feeding mechanism for said carriage, said letter-feeding mechanism being adjustable for different letter-space pitches for justifying the typed lines, a plurality of selectively operable pitch-control devices, each representing a certain letter-feed pitch, means being provided to act automatically in response to operation of any one of said pitch-control devices to adjust said letter-feeding mechanism for the letter-feeding pitch designated by the operated pitch-control device, and means common to said carriage-return mechanism and said pitch-control devices, operable after the typing of a line, for effecting an operation of a selected pitch-control device and an operation of said carriage-return mechanism substantially in conjunction, preparatory to the typing of another line.

37. A master record for a typewriter operable automatically under control of said record for typing a succession of justified lines, said record bearing designations, one for each line, acting as a justifying control, in combination with a carriage of said typewriter, a variable-spacing letter-feed mechanism for said carriage adjustable for a plurality of letter-feeds of different spacings or pitches, and means controlled by said justifying-control designations of the master record to adjust said letter-feed mechanism preparatory to and for justifying each line of typing.

38. Automatic typewriter-mechanism having, in combination, a carriage, a letter-feed mechanism for said carriage, adjustable for one or another of a plurality of different line-justifying letter-feed pitches, a power-actuated operator, typing instrumentalities selectively connectible to said operator, a plurality of letter-feed pitch-controls individually operable to adjust said letter-feed mechanism for a pitch designated by the operated control, and a master record having designations effective to select said pitch-controls and connect the selected control to said power-actuated operator whereby the latter automatically effects adjustment of said letter-feed mechanism.

39. A master record for controlling a reproducing typewriter having singly-operable types, said master record having type-designations for controlling reproduction of a plurality of lines of typing letter by letter and also having line-justifying designations for controlling justification of the typed lines, in combination with power-operated typing instrumentalities controlled by said master record, a carriage, and a variable-pitch letter-feed mechanism for said carriage, and controlled by said master record for adjusting the pitch of said letter-feed mechanism for each line of typing.

40. In combination, a graduated set of letter-feeding racks, a master record for controlling a reproducing typewriter having singly-operable types, said master record having type-designations for controlling reproduction of a plurality of lines of typing letter by letter and also having line-justifying designations for controlling justification of the typed lines, in combination with power-operated typing instrumentalities controlled by said master record, and means controlled by said master-record line-justifying designations for selecting predetermined racks from said set for justifying each of the typed lines.

41. A reproducing typewriter having, in combination, a power-driven operator for actuating singly-operable types, each type having individual means operable for connecting the type to said power-driven operator for a resulting printing stroke, a letter-feeding carriage for coacting with said types, and typed-line justifying means controlling the feed of said carriage and including a plurality of line-justifying controls selectively connectible to said power-driven operator to enable the latter to condition said justifying means for effecting justifying of the typed lines.

42. A reproducing typewriter capable of producing a primely typed work-piece, said typewriter having, in combination, a power-driven operator, singly-operable type-bars having means selectively connectible to said operator for resulting type-bar-printing strokes of uniform imprint-effecting force, a carriage and letter-feeding mechanism therefor co-operative with said type-bars, a master-record device, and means acting under control of said master-record device to actuate said typewriter, said means including master-record controlled mechanism to effect automatic operation of said type-bars by said power-driven operator for typing in successive lines upon said work-piece, and a master-record controlled carriage-return mechanism, and also including master-record controlled means controlling said letter-feeding mechanism to justify the typed lines.

43. A reproducing typewriter capable of producing a succession of letter-by-letter and line-by-line typewritten copies or sheets from a master record, said typewriter including a power-driven operator, singly-operable type-bars having means selectively connectible, under control of the master record, to said power-driven operator for resulting printing and recoil strokes of said type-bars, and letter-feeding mechanism co-operating with said type-bars and having means controlled by the master record preparatory to he typing of each line for justifying the typed lines.

44. In combination with a reproducing typewriter having type-selectors, and a letter-feed mechanism including controls selectively operable to predetermine a certain line-justifying letter-spacing for each line, said letter-feed mechanism also including auxiliary devices operable correlatively with said controls for effecting line-justifying adjustment of said letter-feed mechanism; a master record for said typewriter including, for each typed line, a series of designations for controlling the type-selectors, and also including, for each typed line, a plurality of designations for respectively controlling a line-justifying control and said auxiliary devices preparatory to the typing of each line.

45. In a typewriting machine, the combination of a carriage, an escapement device, a plurality of letter-feed racks having different letter-spacing, and means for automatically selecting a letter-feed rack and operatively connecting the selected rack with the escapement device according to a predetermined typed-line justifying schedule.

46. In a typewriting machine, the combination of a carriage, an escapement device, a plurality of letter-feed racks having different letter-spacing, and means automatically operative for correlating said escapement device and a selected rack according to a predetermined typed-line schedule, said means including provision for withdrawing the escapement device, provision for selecting and operatively positioning a rack, and provision for restoring the withdrawn escapement device to the selected rack.

47. In a typewriting machine, the combination with a frame and a carriage movable thereon, of an escapement pawl mounted on the carriage, an escapement rack-holder, having a plurality of different-pitch racks, shiftable from a primary position to a rack-selecting position, carriage-return mechanism, and means actuated by the carriage-return mechanism for restoring the shifted rack-holder to said primary position.

48. In a typewriting machine, the combination with two members constituting a frame and a carriage movable thereon, of an escapement device mounted on one member, an escapement rack-holder adjustable on the other member, a plurality of escapement racks on said holder, carriage-return mechanism, and means actuated by the carriage-return mechanism for retracting the escapement device relatively to the racks preparatory to selecting one of the latter through adjustment of said holder.

49. In a typewriting machine, the combination with two members constituting a frame and a carriage movable thereon, of an escapement device mounted on one member, an escapement rack-holder having a normal position and adjustable on the other member to different stations, a plurality of escapement racks on said holder, carriage-return mechanism, and means actuated by the carriage-return mechanism for retracting the escapement device relatively to the racks incidentally to returning the rack-holder to normal position preparatory to effecting adjustment of said holder.

RUSSELL G. THOMPSON.